US005617503A

United States Patent [19]
Fronen et al.

[11] Patent Number: 5,617,503
[45] Date of Patent: Apr. 1, 1997

[54] MOTOR CONTROL ARRANGEMENT, AND SHAVER COMPRISING SUCH A MOTOR CONTROL ARRANGEMENT

[75] Inventors: Robert J. Fronen, Eindhoven; Paulus J. C. Van Leest, Drachten; Franciscus A. C. M. Schoofs, Eindhoven, all of Netherlands

[73] Assignee: U.S. Philips Corporation, New York, N.Y.

[21] Appl. No.: 161,002

[22] Filed: Dec. 3, 1993

[30] Foreign Application Priority Data

Dec. 3, 1992 [EP] European Pat. Off. .............. 92203742

[51] Int. Cl.$^6$ ....................................................... G05F 1/10
[52] U.S. Cl. ........................... 388/815; 388/809; 323/320
[58] Field of Search .................... 318/432, 434, 318/433, 440, 558, 254, 138, 439; 363/58, 37, 132, 141, 144, 142; 323/311, 312, 320, 315, 300; 388/800, 809, 811, 815, 816, 819, 821, 831, 833

[56] References Cited

U.S. PATENT DOCUMENTS

| 3,887,863 | 6/1975 | Brokaw | 323/23 |
|---|---|---|---|
| 4,227,127 | 10/1980 | Fukaya et al. | 318/459 |
| 4,232,273 | 11/1980 | Leidich | 330/256 |
| 4,250,457 | 2/1981 | HOfmann | 363/127 |
| 4,450,392 | 5/1984 | Gaslonde . | |
| 4,942,347 | 7/1990 | Ohtani et al. . | |
| 4,959,797 | 9/1990 | McIntosh | 318/432 |
| 5,107,149 | 4/1992 | Platt et al. | 307/529 |
| 5,184,291 | 2/1993 | Crowe et al. | 363/37 |
| 5,235,487 | 8/1993 | Grüning | 303/58 |
| 5,239,242 | 8/1993 | Pickering et al. | 318/65 |
| 5,285,143 | 2/1994 | Bahr et al. | 318/805 |

FOREIGN PATENT DOCUMENTS

| 0376214 | 7/1990 | European Pat. Off. . |
|---|---|---|
| 0397102 | 11/1990 | European Pat. Off. . |
| 597544 | 8/1985 | Japan . |
| 61252279 | 5/1988 | Japan . |
| 62165192 | 1/1989 | Japan . |

*Primary Examiner*—John W. Cabeca
*Attorney, Agent, or Firm*—Laurie E. Gathman

[57] ABSTRACT

A motor control arrangement including a control circuit for controlling the speed of an electric motor (EM), which control circuit comprises a measurement resistor (MR) and a switching transistor (ST) having a control electrode and a main current path coupled in series with the electric motor (EM) and the measurement resistor (MR), a pulse width control stage (PW) coupled to the control electrode of the switching transistor (ST), a motor current measurement stage (MI) for controlling the pulse width control stage (PW) in response to a motor current of the electric motor (EM), and a motor voltage measurement stage (MV) for controlling the pulse width control stage (PW) in response to a motor voltage (EM) of the electric motor (EM). In order to improve the speed control the motor current measurement stage (MI) comprises a voltage-current converter (M3, M4; A1) having an input coupled to a first terminal (3) coupled to the electric motor (EM) and having an output coupled to the pulse width control stage (PW), the voltage-current converter (M3, M4; A1) being adapted to realize a motor current transformation, and the motor voltage measurement stage (MV) comprises a resistor (R1) and a first current mirror (M1) having an input coupled, by a resistor (R1), to a second terminal coupled to the electric motor (EM) and having an output coupled to the pulse width control stage (PW).

45 Claims, 2 Drawing Sheets

MOTOR CONTROL ARRANGEMENT, AND SHAVER COMPRISING SUCH A MOTOR CONTROL ARRANGEMENT

FIELD OF THE INVENTION

The invention relates to a motor control arrangement comprising a first and a second supply voltage terminal, an electric motor, and a control circuit for controlling the speed of the electric motor. The control circuit comprises a first and a second connection terminal coupled to the electric motor, a measurement resistor coupled between the first supply voltage terminal and the first connection terminal, a switching transistor having a main current path coupled between the second connection terminal and the second supply voltage terminal and having a control electrode, a flyback diode coupled between the second connection terminal and the first supply voltage terminal, a pulse width control stage coupled to the control electrode of the switching transistor, a motor voltage measurement stage for controlling the pulse width control stage in response to a motor voltage carried by the electric motor, and a motor current measurement stage for controlling the pulse width control stage in response to a motor current earned by the electric motor.

The invention also relates to motor control arrangement comprising a control circuit, which control circuit comprises either a motor-voltage measurement stage or a motor-current measurement stage.

The invention further relates to a shaver comprising a motor control arrangement as mentioned above.

Although in general such a motor control arrangement can be used in apparatuses comprising an electric motor the relevant motor control arrangement is used in particular in personal care apparatuses, such as shavers.

BACKGROUND OF THE INVENTION

When the electric motor in the motor control arrangement is operated with a supply voltage applied to the first and the second supply voltage terminal a duty cycle impressed on the switching transistor by the pulse width control stage dictates the speed of the electric motor (Pulse Width Modulation), a voltage generated by the electric motor (EMF voltage) being directly proportional to the speed. A simple speed control is obtained when the pulse width control stage is controlled by means of the motor voltage measurement stage in response to the motor voltage. However, since the motor voltage depends both on the voltage generated by the electric motor (EMF voltage) and on a voltage generated by the motor current an inaccurate speed control is obtained, the voltage generated by the motor current being caused by a motor resistance of the electric motor. An improved speed control is achieved when the pulse width control stage is controlled not only by means of the motor voltage measurement stage in response to the motor voltage but also by means of the motor current measurement stage in response to the motor current. From the control in response to the motor voltage and the motor current the pulse width control stage can derive an indication of the difference between the motor voltage and the voltage generated by the motor current, which difference is a measure of the voltage generated by the electric motor (EMF voltage) and of the speed of the electric motor.

A motor control arrangement as mentioned above, which arrangement comprises a control circuit including the motor voltage measurement stage, is known inter alia from the chip which is commercially available from Philips Electronics N.V. under the type number TEA 1019. In the relevant chip the second connection terminal is coupled to an input of a current mirror by means of a first resistor and the first supply voltage terminal is coupled to an output of the current mirror by means of a second resistor. As the input of the current mirror receives a current which is related both to the motor voltage and to a voltage appearing across the first resistor and as the output of the current mirror receives a current which is related to a voltage appearing across the second resistor a current related to the motor voltage can be taken from the output of the current mirror. A disadvantage of the present motor voltage measurement stage is that the first and the second resistor cannot be integrated, which leads to a complex and expensive manufacture, an inaccurate measure of the motor voltage, and an inaccurate speed control.

A motor control arrangement as mentioned above, which arrangement comprises a control circuit including the motor current measurement stage, is known inter alia from the Japanese Patent Application bearing the Application number 59-7544. According to the relevant Patent Application a voltage generated across the measurement resistor is used in order to obtain a measure of the motor current. The voltage generated across the measurement resistor is applied to a non-inverting input of a comparator, which has an inverting input coupled to the first supply voltage terminal by means of a voltage source and which has an output coupled to the pulse width control stage. As a result, the duty cycle of the pulse width control stage is controlled in dependence upon the difference between the voltage generated across the measurement resistor and a voltage supplied by the voltage source, which difference is a measure of the motor current. A disadvantage of the present motor current measurement stage is that the voltage supplied by the voltage source must be adapted to the supply voltage, which is prohibitive of a simple use of the motor current measurement stage. A further consequence of the described relation between the voltage supplied by the voltage source and the supply voltage is that a variation of the supply voltage results in a variation at the non-inverting input of the comparator and in a variation of the duty cycle, leading to an inaccurate speed control.

SUMMARY OF THE INVENTION

It is an object of the invention to provide a motor control arrangement which yields an improved control of the speed of the electric motor.

A motor control arrangement in accordance with the invention is characterized in that the motor voltage measurement stage comprises a resistor and a first current mirror having a common terminal coupled to the first supply voltage terminal, having an input coupled to the second connection terminal by means of a resistor, and having an output coupled to the pulse width control stage, and the motor current measurement stage comprises a voltage-current converter having an input coupled to the measurement resistor and having an output coupled to the pulse width control stage, the voltage-current converter being adapted to realize a motor current transformation. As the motor voltage measurement stage of the motor control arrangement comprises only one (usually non-integrable) resistor the relevant motor voltage measurement stage can be manufactured in a simpler and cheaper manner than the known motor voltage measurement stage. A further advantage of the relevant motor voltage measurement stage is that the measure of the motor current and the speed control are more accurate than in the known motor voltage measurement stage. This further advantage will be explained with reference to the accompanying drawings. As regards the motor current measurement stage of the motor control arrangement it can be stated that owing to the motor current transformation effected by the voltage-current converter the pulse width control stage is controlled independently of the supply voltage, which provides a more accurate speed control. Although the present motor control arrangement comprises both an adapted motor voltage measurement stage and an adapted motor current measurement stage improved speed control is obtained not only by an adaptation of both measurement stages but also by an adaptation of one of the relevant measurement stages.

A further embodiment of a motor control arrangement in accordance with the invention is characterized in that the first current mirror of the motor voltage measurement stage comprises an output transistor of a high-voltage type. Since the relevant output transistor is of a high-voltage type the field of use of the motor voltage measurement stage is extended and the present embodiment is particularly suitable for use in shavers in which motor voltages up to seven hundred volts occur.

A further embodiment of a motor control arrangement in accordance with the invention is characterized in that the first current mirror of the motor voltage measurement stage is a cascoded current mirror. When a current mirror has an input transistor of a low-voltage type and an output transistor of the high-voltage type this will result in a current mirror having a comparatively inaccurate mirror ratio, the use of two transistors of the low-voltage type being impossible in view of the desired voltage range and the use of two transistors of the high-voltage type requiring a comparatively large chip area. In contrast, the cascoded current mirror is capable of realizing an accurate mirror ratio because the output transistor of the high-voltage type can be included as a cascode transistor, the accurate mirror ratio being realized, without any voltage limitation, by means of the cascoded transistors of the low-voltage type.

A further embodiment of a motor control arrangement in accordance with the invention is characterized in that the motor voltage measurement stage comprises a second current mirror having a common terminal coupled to the second supply voltage terminal, having an input coupled to the output of the first current mirror of the motor voltage measurement stage, and having an output coupled to the pulse width control stage, and a current source coupled between the input of the first current mirror of the motor voltage measurement stage and the output of the second current mirror of the motor voltage measurement stage. The present embodiment offers a simple implementation of the motor voltage measurement stage, particularly because the current source provides the bias currents in the first and the second current mirror, the occurrence of undesirable voltages caused by the (mains) supply voltage being prevented. The current source will generally be realized by means of a transistor of a high-voltage type.

A further embodiment of a motor control arrangement in accordance with the invention is characterized in that the voltage-current converter comprises an integrable resistor, a first current mirror having an input and an output, and a second current mirror having a common terminal coupled to the second supply voltage terminal, having an input coupled to the output of the first current mirror of the motor current measurement stage, and having an output coupled to the input of the first current mirror of the motor current measurement stage, the current mirror of the motor current measurement stage being degenerated by means of the measurement resistor and the integrable resistor, and the second current mirror of the motor current measurement stage being coupled to the pulse width control stage. The present embodiment is an implementation of the voltage-current converter, which implementation comprises only integrable resistors and effects the motor current transformation via the mirror ratio of the current mirror, the control signal supplied by the motor current measurement stage not being influenced by the supply voltage. A further advantage of the relevant embodiment is that the current mirror is capable of converting a large current through the measurement resistor into a small current through the integrable resistor.

A further embodiment of a motor control arrangement in accordance with the invention is characterized in that the second current mirror of the motor current measurement stage is degenerate. When the second current mirror is degenerated by means of two integrable resistors this will lead to an improved accuracy of the motor current measurement stage.

A further embodiment of a motor control arrangement in accordance with the invention is characterized in that the first current mirror of the motor current measurement stage is a cascoded current mirror and in that the second current mirror of the motor current measurement stage is a cascoded current mirror. Similarly to the current mirror of the motor voltage measurement stage the cascoder current mirrors can realize an accurate mirror ratio when the output transistors of the high-voltage type are included as a cascode transistor, the accurate mirror ratio being realized, without any voltage limitation, by means of the transistors of the low-voltage type coupled to the cascoded transistors.

A further embodiment of a motor control arrangement in accordance with the invention is characterized in that the voltage-current converter comprises a current source coupled between the input of the first current mirror of the motor current measurement stage and the second supply voltage terminal. The relevant current source forms a simple starting circuit for the first and the second current mirror.

A further embodiment of a motor control arrangement in accordance with the invention is characterized in that the voltage-current converter comprises an integrable resistor, a differential amplifier having a non-inverting input coupled to the first connection terminal, having an inverting input coupled to the first supply voltage terminal by means of the integrable resistor, and having an output, and a transistor having a main current path coupled between the inverting input of the differential amplifier and the pulse width control stage and having a control electrode coupled to the output of the differential amplifier. The present embodiment is an alternative to the afore-mentioned implementation of the voltage-current converter, which alternative comprises only a small number of components, the control signal supplied by the motor current measurement stage not being influenced by the supply voltage.

A further embodiment of a motor control arrangement in accordance with the invention is characterized in that the transistor is of a high-voltage type, and in that the differential amplifier comprises a current source transistor of a high-voltage type. When both transistors are of a high-voltage type the motor current measurement stage is suitable for a wide field of use and the present embodiment is particularly suitable for use in shavers in which motor voltages up to seven hundred volts occur.

A shaver in accordance with the invention is characterized in that the shaver comprises a motor control arrangement in accordance with the invention. Since the motor control arrangement comprises a small number of non-integrable components (resistors) and has a large voltage range the motor control arrangement in accordance with the invention is particularly suitable for shavers, a substantial cost reduction and a substantial benefit being obtained in that one non-integrable component is saved.

BRIEF DESCRIPTION OF THE DRAWINGS

The above and other (more detailed) features of the invention will now be described and elucidated more elaborately with reference to the accompanying drawings, in which.

DETAILED DESCRIPTION OF THE PREFERRED EMBODIMENTS

Figure 1:
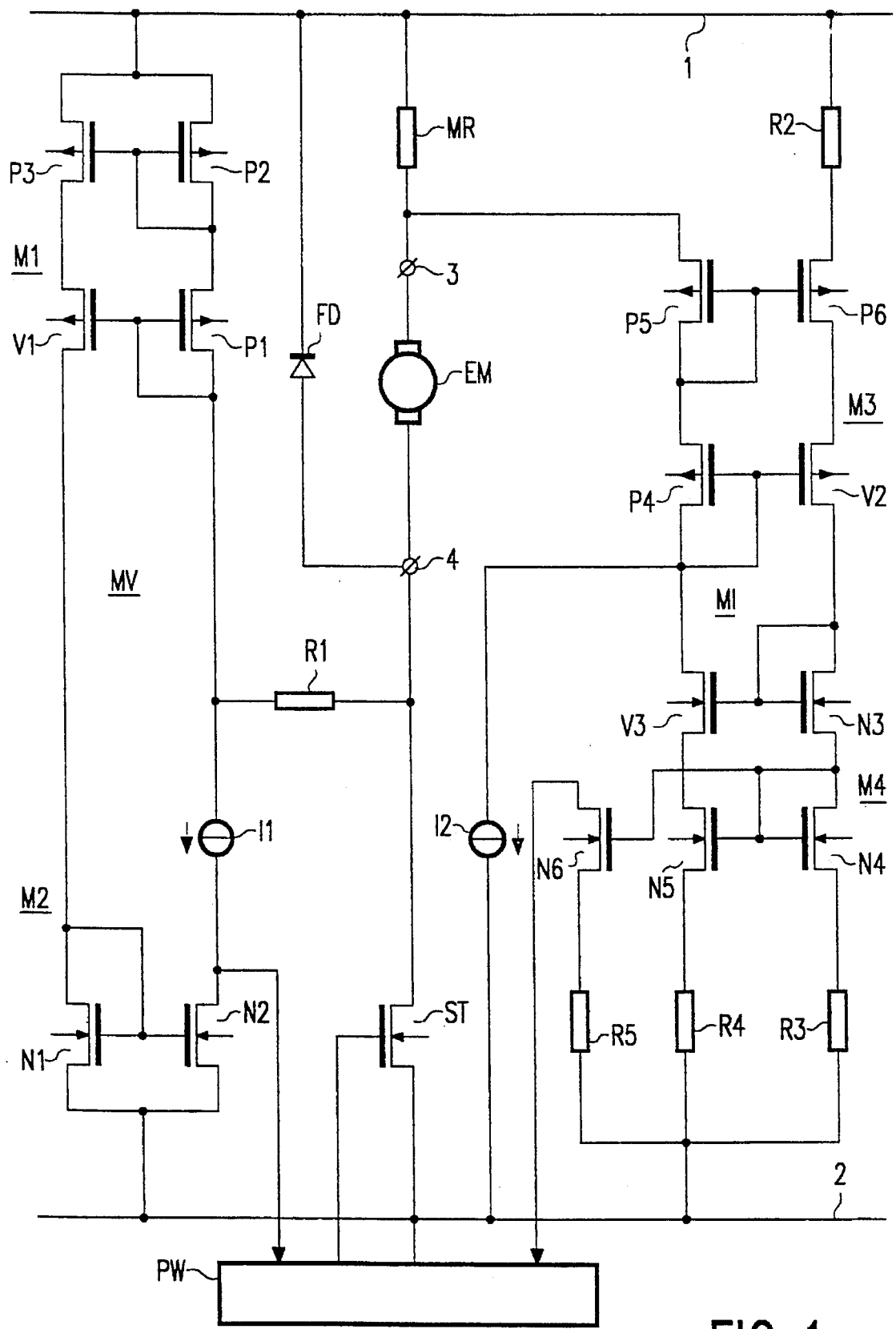
FIG. 1 shows a first embodiment of a motor control arrangement in accordance with the invention.

In these Figures like pans bear the same reference numerals.

FIG. 1 shows a first embodiment of a motor control arrangement in accordance with the invention, which embodiment comprises a first supply voltage terminal 1, a second supply voltage terminal 2, an electric motor EM, and a control circuit (MV, MI) for controlling the speed of the electric motor EM. The control circuit (MV, MI) has a first connection terminal 3 and a second connection terminal 4, between which the electric motor EM is coupled, a measurement resistor MR coupled between the supply voltage terminal 1 and the connection terminal 3, a switching transistor ST having a control electrode and having a main current path coupled between the connection terminal 4 and the supply voltage terminal 2, a flyback diode FD coupled between the connection terminal 4 and the supply voltage terminal 1, a pulse width control stage PW coupled to the control electrode of the switching transistor ST, a motor voltage measurement stage MV for controlling the pulse width control stage PW in response to a motor voltage carded by the electric motor EM, and a motor current measurement stage MI for controlling the pulse width control stage PW in response to a motor current carried by the electric motor EM. Such a motor control arrangement, in which the motor voltage and the motor current are measured at a high-voltage side (supply voltage terminal 1) and the electric motor EM is controlled at a low-voltage side (supply voltage terminal 2) is referred to as a "motor control arrangement with high-side motor measurement and low-side motor control". In accordance with the invention the motor voltage measurement stage MV in the present embodiment comprises a resistor R1, a first current mirror M1, a second current mirror M2, and a current source I1. The current mirror M1 has a common terminal coupled to the supply voltage terminal 1, an input coupled to the connection terminal 4 by means of the resistor R1, and an output coupled to the pulse width control stage PW. The current mirror M1 is a cascoded current mirror comprising a diode-coupled transistor P1 having a control electrode and a main current path, an output transistor V1 having a control electrode coupled to the control electrode of the transistor P1 and having a main current path, a diode-coupled transistor P2 having a control electrode and having a main current path coupled between the input, via the main current path of the transistor P1, and the common terminal, and a transistor P3 having a control electrode coupled to the control electrode of the transistor P2 and having a main current path coupled between the output, via the main current path of the output transistor V1, and the common terminal, the output transistor V1 being of a high-voltage tape. The current mirror M2 has a common terminal coupled to the supply voltage terminal 2, an input coupled to the output of the current mirror M1, and an output coupled to the pulse width control stage PW. The current mirror M2 comprises a diode-coupled transistor N1 having a control electrode and having a main current path coupled between the input and the common terminal, and a transistor N2 having a control electrode coupled to the control electrode of the transistor N1 and having a main current path coupled between the output and the common terminal. The current source I1 is coupled between the input of the current mirror M1 and the output of the current mirror M2. In accordance with the invention the motor current measurement stage MI in the present embodiment comprises a voltage-current converter (M3, M4) coupled to the measurement resistor MR and to the pulse width control stage PW, the voltage-current converter (M3, M4) being adapted to realize a motor current transformation. The voltage-current converter (M3, M4) comprises an integrable resistor R2, a first current mirror M3 having an input and an output, a second current mirror M4 having a common terminal coupled to the supply voltage terminal 2, having an input coupled to the output of the current mirror M3, and having an output coupled to the input of the current mirror M3, and a current source I2, which functions as a starting circuit and which is coupled between the input of the current mirror M3 and the supply voltage terminal 2. The current mirror M3 is a cascoded current mirror degenerated by means of the measurement resistor MR and the integrable resistor R2 and comprising a diode-coupled transistor P4 having a control electrode and a main current path, an output transistor V2 having a control electrode coupled to the control electrode of the transistor P4 and having a main current path, a diode-coupled transistor P5 having a control electrode and having a main current path coupled between the input, via the main current path of the transistor P4, and the supply voltage terminal 1, via the measurement resistor MR, and a transistor P6 having a control electrode coupled to the control electrode of the transistor P5 and having a main current path coupled between the output, via the main current path of the output transistor V2, and the supply voltage terminal 1, via the resistor R2, the output transistor V2 being of the high-voltage type. The current mirror M4 is a cascoded current mirror degenerated by means of a resistor R3 and a resistor R4 and comprising a diode-coupled transistor N3 having a control electrode and a main current path, an output transistor V3 having a control electrode coupled to the control electrode of the transistor N3 and having a main current path, a diode coupled transistor N4 having a control electrode and having a main current path coupled between the input, via the main current path of the transistor N3, and the common terminal, via the resistor R3, and a transistor N5 having a control electrode coupled to the control electrode of the transistor N4 and having a main current path coupled between the output, via the main current path of the output transistor V3, and the common terminal, via the resistor R4, the output transistor V3 being of a high-voltage type. In the present embodiment the current mirror M4 further comprises a resistor R5 and a transistor N6 having a control electrode coupled to the control electrodes of the transistors N4 and N5 and having a main current path coupled between the common terminal, via the resistor R5, and the pulse width control stage PW. As regards the operation of the motor control arrangement in the present embodiment the following can be stated. When the electric motor EM in the motor control arrangement is operated with a supply voltage applied to the supply voltage terminals 1 and 2 a duty cycle impressed on the switching transistor ST by the pulse width control stage PW dictates the speed of the electric motor EM (Pulse Width Modulation) and a flyback current generated by the electric motor EM flows through the flyback diode FD. Since the speed is directly proportional to a voltage (EMF voltage) generated by the electric motor EM an adequate speed control can be obtained when the pulse width control stage PW is controlled by means of the motor voltage measurement stage MV in response to the motor voltage and by means of the motor current measurement stage MI in response to the motor current. From a control in response to both the motor voltage and the motor current the pulse width control stage PW can derive an indication of the difference between the motor voltage and the voltage generated by the motor current, which difference is a measure of the voltage (EMF voltage) generated by the electric motor EM and of the speed of the electric motor EM. Deriving the difference and controlling the switching transistor is effected by means of a known technique, which is employed inter alia in the chip having the type number TEA 1019, which is commercially available from Philips Electronics N.V. Since the motor voltage measurement stage MV is coupled to the connection terminal 4 the motor voltage and a voltage across the measurement resistor MR appear across the resistor R1 and the main current paths of the transistors P1 and P2, which hereinafter is ignored relative to the motor voltage. The main current paths of the transistors P1 and P2 (and N2) are biassed by a current generated by the current source I1 and the transistors P1 and P2 generate an additional current in the main current paths of the transistors P3 and V1, which additional current is a measure of the motor voltage. By means of the transistors N1 and N2 the additional current is applied to the pulse width control stage PW. Since the (integrable output) transistor V1 is of a high-voltage type and the (generally non-integrable) resistor R1 protects the transistors P1 and P2 against a possible excess voltage the present motor voltage measurement stage has the advantage that it can handle a high motor voltage. The contribution of the motor voltage measurement stage MV to an accurate speed control is obtained in that the motor voltage measurement stage MV can be integrated almost wholly, an accurate mirror ratio being realized by means of the low-voltage type transistors P2, P3 and N1, N2. As the motor current measurement stage MI is coupled to the connection terminal 3 a current which is a measure of the motor current through the measurement resistor MR will flow through the transistors P4, P5, P6 and V2. When the transistors P4, P5, P6 and V2 are dimensioned appropriately a motor current transformation is achieved which ensures that the measure of the motor current has the desired value. By means of the transistors N3, N4, N5, V3 and N6 the measure of the motor current is applied to the pulse width control stage. Since the (integrable output) transistors V2 and V3 are of a high-voltage type the present motor current measurement stage MI has the advantage that it can handle a high supply voltage. The contribution of the motor current measurement stage MI to an accurate speed control is obtained in that the motor current measurement stage MI can be integrated wholly, an accurate mirror ratio being realized by means of the low-voltage type transistors P2, P3 and N1, N2 as well as N6.

Figure 2:
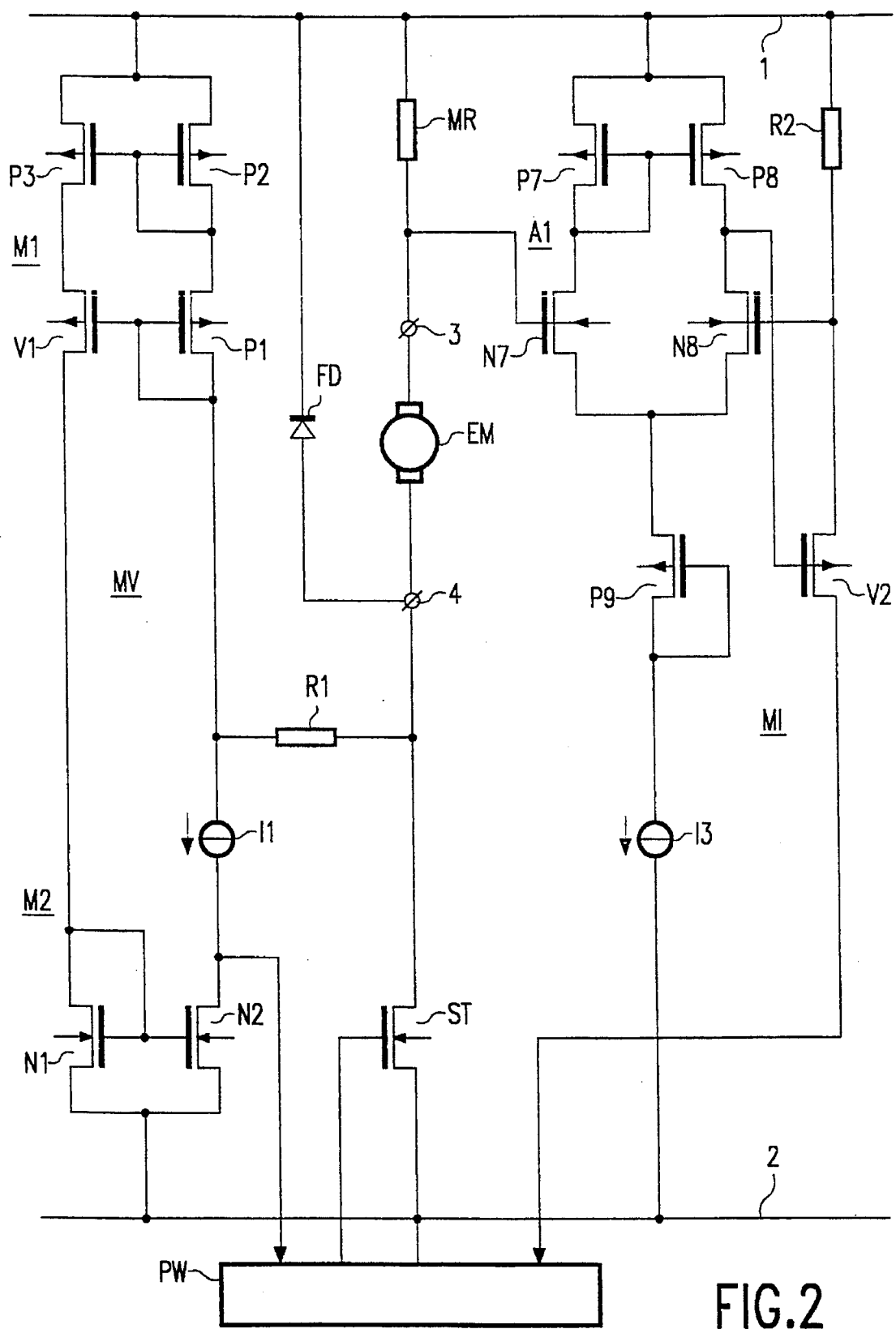
FIG. 2 shows a second embodiment of a motor control arrangement in accordance with the invention.

FIG. 2 shows a second embodiment of a motor control arrangement in accordance with the invention, which embodiment comprises a voltage-current converter which differs from that shown in the preceding Figure. In accordance with the invention the motor voltage measurement stage MI in the present embodiment comprises a voltage-current converter (A1, R2, V2) coupled to the measurement resistor MR and to the pulse width control stage PW, the voltage-current converter (A1, R2, V2) being adapted to realize the motor current transformation. The voltage-current converter (A1, R2, V2) comprises an integrative resistor R2, a differential amplifier A1 having a non-inverting input coupled to the supply voltage terminal 1 via the measurement resistor MR, having an inverting input coupled to the supply voltage terminal 1 via the integrable resistor R2, and having an output, and a transistor V2 having a control electrode coupled to the output of the differential amplifier A1 and having a main current path coupled between the inverting input of the differential amplifier A1 and the pulse width control stage PW, the transistor V2 being of a high-voltage type. The differential amplifier A1 further comprises a differential-pair transistor N7 having a control electrode coupled to the non-inverting input and having a main current path, a differential-pair transistor N8 having a control electrode coupled to the inverting input and having a main current path, a diode-coupled current-mirror transistor P7 having a control electrode and having a main current path coupled between the main current path of the differential-pair transistor N7 and the supply voltage terminal 1, a current-mirror transistor P8 having a control electrode coupled to the control electrode of the current-mirror transistor P7 and having a main current path coupled between the main current path of the differential-pair transistor N8 and the supply voltage terminal 1, a diode-coupled transistor P9, and a current source I3, the main current paths of the differential-pair transistors N7 and N8 being coupled to the supply voltage terminal 2 via the transistor P9 and the current source I3, which current source I3 may comprise a current-source transistor (I3) of a high-voltage type. As the motor current measurement stage MI is coupled to the connection terminal 3 by means of the non-inverting input of the differential amplifier A1 the output transistor V2 will be controlled in such a manner that a voltage appearing across the resistor R2 is equal to a voltage across the measurement resistor MR. As a result, a current which is a measure of the motor current will flow in the output transistor V2. When the components are suitably dimensioned a motor current transformation is realized such that the measure of the motor current will have the desired value. Since the (integrable) output transistor V1 and the current source I3 are of a high-voltage type has the advantage that it can handle a high supply voltage. A further advantage of a motor current measurement stage MI in accordance with the invention is that the motor current measurement stage MI can be fully integrated. As a result of the minimization of the number of (generally) non-integrable components the production costs of the motor current measurement stage MI are reduced considerably and a more accurate speed control is obtained.

The invention is not limited to the embodiments shown herein. Within the scope of the invention several modifications will be conceivable to those skilled in the art. A first example of such a modification is the resistor in the motor voltage measurement stage, which resistor may be coupled between the second connection terminal and a point between the main current paths of the diode-coupled transistors (P1 and P2) of the first current mirror in order to improve the accuracy required for the motor voltage measurement stage. A second example of such a modification is the voltage-current converter, which can be constructed in various manners. Moreover, it is to be noted that the described embodiments of the motor control arrangement generally comprise, in addition, a capacitor coupled between the connection terminals in order to provide the required interference suppression.

We claim:

1. A motor control arrangement comprising:

a first and a second supply voltage terminal, an electric motor, and a control circuit for controlling the speed of the electric motor, said control circuit comprises a first and a second connection terminal coupled to the electric motor, a measurement resistor coupled between the first supply voltage terminal and the first connection terminal, a switching transistor having a main current path coupled between the second connection terminal and the second supply voltage terminal and having a control electrode, a flyback diode coupled between the second connection terminal, a pulse width control stage coupled to the control electrode of the switching transistor, and a motor voltage measurement stage for controlling the pulse width control stage in response to a motor voltage carried by the electric motor, wherein the motor voltage measurement stage comprises a resistor and a first current mirror having a common terminal coupled to the first supply voltage terminal, having an input coupled to the second connection terminal by means of the resistor, and having an output coupled to the pulse width control stage.

2. A motor control arrangement as claimed in claim 1, characterized in that the first current mirror of the motor voltage measurement stage is a cascoded current mirror.

3. A shaver comprising a motor control arrangement comprising:

a first and a second supply voltage terminal, an electric motor, and a control circuit for controlling the speed of the electric motor, said control circuit comprises a first and a second connection terminal coupled to the electric motor, a measurement resistor coupled between the first supply voltage terminal and the first connection terminal, a switching transistor having a main current path coupled between the second connection terminal and the second supply voltage terminal and having a control electrode, a flyback diode coupled between the second connection terminal and the first supply terminal, a pulse width control state coupled to the control electrode of the switching transistor, a motor voltage measurement stage for controlling the pulse width control stage in response to a motor voltage carried by the electric motor, and a motor current measurement stage for controlling the pulse width control stage in response to a motor current carried by the electric motor, wherein the motor voltage measurement stage comprises a resistor and a first current mirror having a common terminal coupled to the first supply voltage terminal having an input coupled to the second connection terminal by means of the resistor, and having an output coupled to the pulse width control stage, and the motor current measurement stage comprises a voltage-current converter having an input coupled to the measurement resistor and having an output coupled to the pulse width control stage.

4. A shaver including a motor control arrangement comprising:

a first and a second supply voltage terminal, an electric motor, and a control circuit for controlling the speed of the electric motor, which control circuit comprises a first and a second connection terminal coupled to the electric motor, a measurement resistor coupled between the first supply voltage terminal and the first connection terminal, a switch having a main current path coupled between the second connection terminal and the second supply voltage terminal and having a control electrode, a control stage coupled to the control electrode of the switch, and a motor voltage measurement stage for controlling the control stage in response to a motor voltage carried by the electric motor, wherein the motor voltage measurement stage comprises a resistor and a first current mirror having a common terminal coupled to the first supply voltage terminal, having an input coupled to the second connection terminal by means of a resistor, and having an output coupled to the control stage.

5. A shaver including a motor control arrangement comprising:

a first and a second supply terminal;

an electric motor; and a control circuit including a motor voltage measurement stage for measuring the electric motor voltage, a motor current measurement stage for measuring the motor current, a measuring resistor coupled to the first supply terminal and the electric motor, and a control stage coupled to the motor voltage measurement stage and the motor current measurement stage for controlling the speed of the electric motor in response to signals from the motor voltage measurement stage and the motor current measurement stage, the motor voltage measurement stage including a resistor and a first current mirror having an input coupled to the electric motor via the resistor and an output coupled to the control stage, and the motor current measurement stage comprising a voltage-current converter having an input coupled to the measurement resistor and having an output coupled to the control stage.

6. A shaver including a motor control arrangement comprising:

a first and a second supply terminal;

an electric motor; and a control circuit including a motor voltage measurement stage for measuring the electric motor voltage, and a control stage coupled to the motor voltage measurement stage for controlling the speed of the electric motor in response to a signal from the motor voltage measurement stage, the motor voltage measurement stage including a resistor and a first current mirror having an input coupled to a first end of the resistor and a second end of the resistor being coupled to the electric motor and an output of the motor voltage measurement stage being coupled to the control stage.

7. A motor control arrangement comprising:

a first and a second supply terminal;

an electric motor; and a control circuit including a motor voltage measurement stage for measuring the electric motor voltage, a motor current measurement stage for measuring the electric motor current, a measuring resistor coupled to the first supply terminal and the electric motor, and a control stage coupled to the motor voltage measurement stage and the motor current measurement stage for controlling the speed of the electric motor in response to signals from the motor voltage measurement stage and the motor current measurement stage, the motor voltage measurement stage including a resistor and a current mirror having an input coupled to the electric motor via the resistor and an output coupled to the control stage, and the motor current measurement stage comprising a voltage-current converter having an input coupled to the measurement resistor and having an output coupled to the control stage.

8. A motor control arrangement as claimed in claim 7, characterized in that the current mirror of the motor voltage measurement stage comprises an output transistor of a high-voltage type.

9. A motor control arrangement as claimed in claim 7, characterized in that the current mirror of the motor voltage measurement stage is a cascoded current mirror.

10. A motor control arrangement as claimed in claim 7, characterized in that the motor voltage measurement stage comprises an additional current mirror having a common terminal coupled to the second supply voltage terminal, having an input coupled to the output of the current mirror of the motor voltage measurement stage, and having an output coupled to the control stage, and a current source coupled between the input of the current mirror of the motor voltage measurement stage and the output of the additional current mirror of the motor voltage measurement stage.

11. A motor control arrangement as claimed in claim 7, characterized in that the voltage-current converter comprises an integrable resistor, a further current mirror having an input and an output, and another current mirror having a common terminal coupled to the second supply voltage terminal having an input coupled to the output of the further current mirror of the motor current measurement stage, and having an output coupled to the input of the further current mirror of the motor current measurement stage, and the further current mirror of the motor current measurement stage being degenerated by means of the measurement resistor and the integrable resistor, and the another current mirror of the motor current measurement stage being coupled to the control stage.

12. A motor control arrangement as claimed in claim 11, characterized in that the another current mirror of the motor current measurement stage is degenerate.

13. A motor control arrangement as claimed in claim 11, characterized in that the further current mirror of the motor current measurement stage comprises an output transistor of a high-voltage type.

14. A motor control arrangement as claimed in claim 11, characterized in that the another current mirror of the motor current measurement stage comprises an output transistor of a high-voltage type.

15. A motor control arrangement as claimed in claim 11, characterized in that the further current mirror of the motor current measurement stage is a cascoded current mirror.

16. A motor control arrangement as claimed in claim 11, characterized in that the another current mirror of the motor current measurement stage is a cascoded current mirror.

17. A motor control arrangement as claimed in claim 11, characterized in that the voltage-current converter comprises a current source coupled between the input of the further current mirror of the motor current measurement stage and the second supply voltage terminal.

18. A motor control arrangement as claimed in claim 11, characterized in that the voltage-current converter comprises an integrable resistor, a differential amplifier having a non inverting input coupled to the first connection terminal, having an inverting input coupled to the first supply voltage terminal by means of the integrable resistor, and having an output, and a transistor having a main current path coupled between the inverting input of the differential amplifier and the control stage, and having a control electrode coupled to the output of the differential amplifier.

19. A motor control arrangement comprising:

a first and a second supply voltage terminal, an electric motor, and a control circuit for controlling the speed of the electric motor, said control circuit comprises a first and a second connection terminal coupled to the electric motor, a measurement resistor coupled between the first supply voltage terminal and the first connection terminal, a switching transistor having a main current path coupled between the second connection terminal and the second supply voltage terminal and having a control electrode, a flyback diode coupled between the second connection terminal and the first supply voltage terminal, a pulse width control stage coupled to the control electrode of the switching transistor, a motor voltage measurement stage for controlling the pulse width control stage in response to a motor voltage carried by the electric motor, and a motor current measurement stage for controlling the pulse width control stage in response to a motor current carried by the electric motor, wherein the motor voltage measurement stage comprises a resistor and a first current mirror having a common terminal coupled to the first supply voltage terminal, having an input coupled to the second connection terminal by means of the resistor, and having an output coupled to the pulse width control stage, and the motor current measurement stage comprises a voltage-current converter having an input coupled to the measurement resistor and having an output coupled to the pulse width control stage.

20. A motor control arrangement as claimed in claim 1, characterized in that the first current mirror of the motor voltage measurement stage comprises an output transistor of a high-voltage type.

21. A motor control arrangement as claimed in claim 1, characterized in that the first current mirror of the motor voltage measurement stage is a cascoded current mirror.

22. A motor control arrangement as claimed in claim 1, characterized in that the motor voltage measurement stage comprises a second current mirror having a common terminal coupled to the second supply voltage terminal, having an input coupled to the output of the first current mirror of the motor voltage measurement stage, and having an output coupled to the pulse width control stage, and a current source coupled between the input of the first current mirror of the motor voltage measurement stage and the output of the second current mirror of the motor voltage measurement stage.

23. A motor control arrangement as claimed in claim 1, characterized in that the voltage-current converter comprises an integrable resistor, a first current mirror having an input and an output, and a second current mirror having a common terminal coupled to the second supply voltage terminal, having an input coupled to the output of the first current mirror of the motor current measurement stage, and having an output coupled to the input of the first current mirror of the motor current measurement stage, the current mirror of the motor current measurement stage being degenerated by means of the measurement resistor and the integrable resistor, and the second current mirror of the motor current measurement stage being coupled to the pulse width control stage.

24. A motor control arrangement as claimed in claim 23, characterized in that the second current mirror of the motor current measurement stage is degenerate.

25. A motor control arrangement as claimed in claim 23, characterized in that the first current mirror of the motor current measurement stage comprises an output transistor of a high-voltage type.

26. A motor control arrangement as claimed in claim 23, characterized in that the second current mirror of the motor current measurement stage comprises an output transistor of a high-voltage type.

27. A motor control arrangement as claimed in claim 23, characterized in that the first current mirror of the motor current measurement stage is a cascoded current mirror.

28. A motor control arrangement as claimed in claim 23, characterized in that the second current mirror of the motor current measurement stage is a cascoded current mirror.

29. A motor control arrangement as claimed in claim 23, characterized in that the voltage-current converter comprises a current source coupled between the input of the first current mirror of the motor current measurement stage and the second supply voltage terminal.

30. A motor control arrangement as claimed in claim 1, characterized in that the voltage-current converter comprises an integrable resistor, a differential amplifier having a non-inverting input coupled to the first connection terminal, having an inverting input coupled to the first supply voltage terminal by means of the integrative resistor, and having an output, and a transistor having a main current path coupled between the inverting input of the differential amplifier and the pulse width control stage; and having a control electrode coupled to the output of the differential amplifier.

31. A motor control arrangement as claimed in claim 30, characterized in that the transistor is of a high-voltage type.

32. A motor control arrangement as claimed in claim 30, characterized in that the differential amplifier comprises a current source transistor of a high-voltage type.

33. A motor control arrangement as claimed in claim 20, characterized in that the first current mirror of the motor voltage measurement stage is a cascoded current mirror.

34. A motor control arrangement comprising:

a first and a second supply terminal;

an electric motor; and a control circuit including a motor voltage measurement stage for measuring the electric motor voltage, and a control stage coupled to the motor voltage measurement stage for controlling the speed of the electric motor in response to a signal from the motor voltage measurement stage, the motor voltage measurement stage including a resistor and a current mirror having an input coupled a first end of the resistor and a second end of the resistor being coupled to the electric motor and an output of the motor voltage measurement stage being coupled to the control stage.

35. A motor control arrangement as claimed in claim 34, characterized in that the current mirror of the motor voltage measurement stage comprises an output transistor of a high-voltage type.

36. A motor control arrangement as claimed in claim 34, characterized in that the current mirror of the motor voltage measurement stage is a cascoded current mirror.

37. A motor control arrangement as claimed in claim 34, characterized in that the motor voltage measurement stage comprises an additional current mirror having a common terminal coupled to the second supply voltage terminal, having an input coupled to the output of the current mirror of the motor voltage measurement stage, and having an output coupled to the control stage, and a current source coupled between the input of the current mirror of the motor voltage measurement stage and the output of the additional current mirror of the motor voltage measurement stage.

38. A motor control arrangement as claimed in claim 34, characterized in that the voltage-current converter comprises an integrable resistor, a current mirror having an input and an output, and another current mirror having a common terminal coupled to the second supply voltage terminal having an input coupled to the output of the further current mirror of the motor current measurement stage, and having an output coupled to the input of the further current mirror of the motor current measurement stage, and the current mirror of the motor current measurement stage being degenerated by means of the measurement resistor and the integrable resistor, and the another current mirror of the motor current measurement stage being coupled to the control stage.

39. A motor control arrangement as claimed in claim 38, characterized in that the another current mirror of the motor current measurement stage is degenerate.

40. A motor control arrangement as claimed in claim 38, characterized in that the further current mirror of the motor current measurement stage comprises an output transistor of a high-voltage type.

41. A motor control arrangement as claimed in claim 38, characterized in that the another current mirror of the motor current measurement stage comprises an output transistor of a high-voltage type.

42. A motor control arrangement as claimed in claim 38, characterized in that the further current mirror of the motor current measurement stage is a cascoded current mirror.

43. A motor control arrangement as claimed in claim 38, characterized in that the another current mirror of the motor current measurement stage is a cascoded current mirror.

44. A motor control arrangement as claimed in claim 38, characterized in that the voltage-current converter comprises a current source coupled between the input of the further current mirror of the motor current measurement stage and the another supply voltage terminal.

45. A motor control arrangement as claimed in claim 38, characterized in that the voltage-current converter comprises an integrable resistor, a differential amplifier having a non inverting input coupled to the first connection terminal, having an inverting input coupled to the first supply voltage terminal by means of the integrable resistor, and having an output, and a transistor having a main current path coupled between the inverting input of the differential amplifier and the control stage, and having a control electrode coupled to the output of the differential amplifier.

* * * * *